United States Patent [19]
Moore et al.

[11] Patent Number: 5,965,951
[45] Date of Patent: Oct. 12, 1999

[54] MODULAR WIRE HARNESS AND CARPET FOR VEHICLE

[75] Inventors: Nathan Moore, Dearborn, Mich.; Klaus Schorn, Cologne, Germany

[73] Assignee: Lear Automotive Dearborn, Inc., Southfield, Mich.

[21] Appl. No.: 09/037,596

[22] Filed: Mar. 10, 1998

[51] Int. Cl.⁶ ........................................ H02G 3/12

[52] U.S. Cl. ................ 307/10.1; 156/304.4; 174/72 A; 307/147; 439/925

[58] Field of Search .................. 307/10.1, 118, 307/147; 174/117 F, 72 A; 439/540.1, 925; 340/666; 428/36.1; 264/263; 156/304.4; 254/200; 361/826

[56] References Cited

U.S. PATENT DOCUMENTS

| | | | |
|---|---|---|---|
| 4,030,801 | 6/1977 | Bunnell | 439/925 |
| 4,773,155 | 9/1988 | Buchien | 264/263 |
| 4,890,007 | 12/1989 | Vu et al. | 307/118 |
| 5,204,672 | 4/1993 | Brooks | 340/825.71 |
| 5,698,477 | 12/1997 | Iwamaru et al. | 428/36 |

*Primary Examiner*—Albert W. Paladini
*Attorney, Agent, or Firm*—MacMillan, Sobanski & Todd, LLC

[57] ABSTRACT

The incorporation of a wire harness and a carpet provide a modular combination which reduces the required assembly steps for a vehicle. The wire harness may be attached to the underside of a carpet in any way to form the modular combination. Once the modular combination is completed, it is then mounted into a vehicle.

10 Claims, 2 Drawing Sheets

MODULAR WIRE HARNESS AND CARPET FOR VEHICLE

BACKGROUND OF THE INVENTION

This invention relates to the use of a one piece modular assembly which incorporates both the carpeting and a floor wire harness for a vehicle.

Modern vehicles are typically provided with carpeting in the vehicle cab. In addition, a wire harness typically has ran beneath the carpeting. As vehicle electronics become more and more complex, there are more and more wires and wire harnesses incorporated into the vehicle.

Typically, these wire harnesses have been placed into the vehicle and connected to the vehicle floor prior to installation of the carpeting. This prior art method has required additional method steps. More importantly, the wire harness has remained exposed and subject to damage during assembly.

The prior art has also typically required indented channels in the metal floor to accommodate the wires, and/or alternatively, has used a plastic routing member (trough or convolute). It would be desirable to eliminate the need for any special routing structure. In addition, the wires are left exposed for a period of time until the carpet is placed in the vehicle.

SUMMARY OF THE INVENTION

In the disclosed embodiment of this invention, a wire harness is attached to a vehicle carpet piece prior to the vehicle carpet being placed into the vehicle. In one preferred embodiment, the wire harness is assembled as a separate step, and then is attached to the carpeting prior to installation of the carpeting into the vehicle.

Preferably, the wire harness is positioned on the carpeting at a location where abrasion or rubbing through the carpeting and to the wire harness is minimized.

In embodiments of this invention, the wire harness may be stapled, sewn, or attached by adhesive to the carpet backing.

In other embodiments, the wire harness can be assembled onto the carpeting and then attached to the vehicle.

These and other features of the present invention can be best understood from the following specification and drawings, of which the following is a brief description.

DETAILED DESCRIPTION OF A PREFERRED EMBODIMENT

Figure 1:
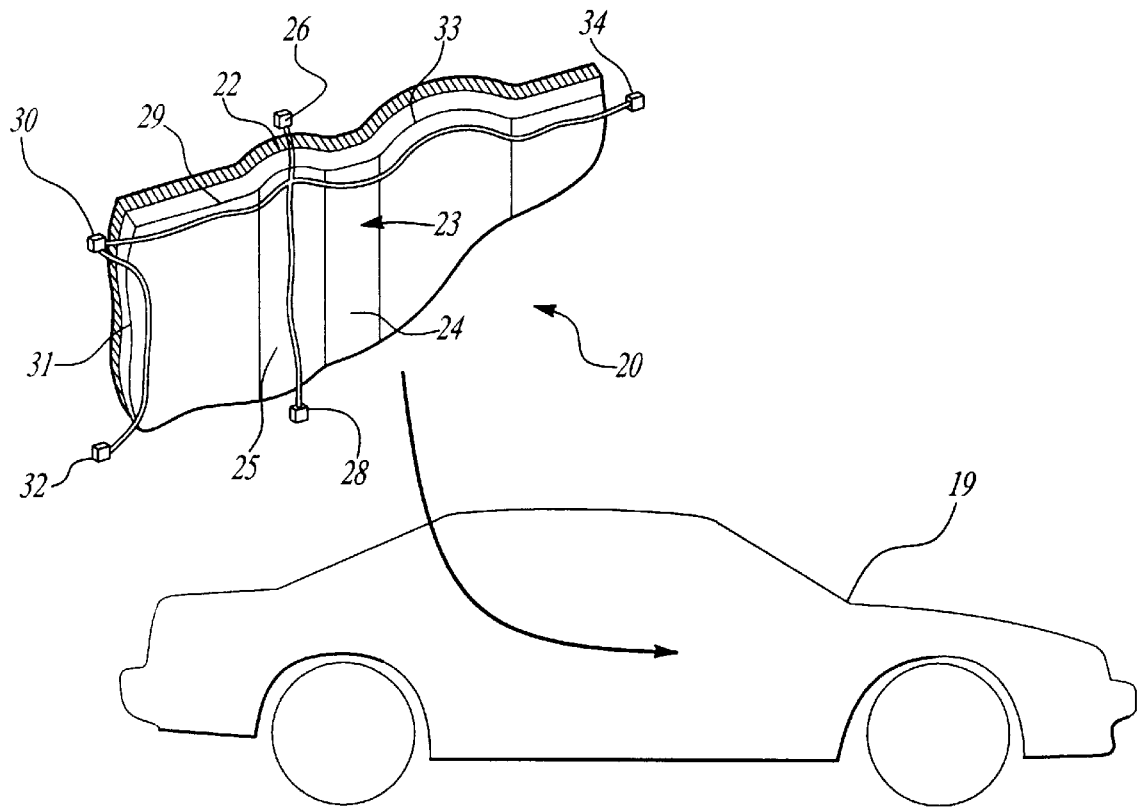
FIG. 1 shows a schematic combination of a vehicle carpet and wire harness assembly.

FIG. 1 shows a vehicle 19 receiving a modular carpet and wire harness assembly 20. As shown, the carpet 22 receives the wire harness 23. A longitudinally extending portion 24 may extend between connector 26 and another connector 28. Jumper wires 29 and 33 may extend to connectors 30 and 34. Jumper 31 extends to connector 32. As understood, although shown as a single wire, a wire harness typically includes a plurality of wires which route electrical signals and power between various components which are connected to the several connectors shown in this drawing. The structure of the wire harness itself is not inventive, and thus it is shown somewhat schematically.

Notably, the carpet 22 includes a channel 25 which receives the longitudinally extending portion 24. Channel 25 is to placed over structure on the vehicle floor such as the ridge over the engine. This is a desirable location to place the wire harness as there is less abrasion or rubbing through the carpet to the wire. This is true because people tend not to walk or step on this area.

Figure 2:
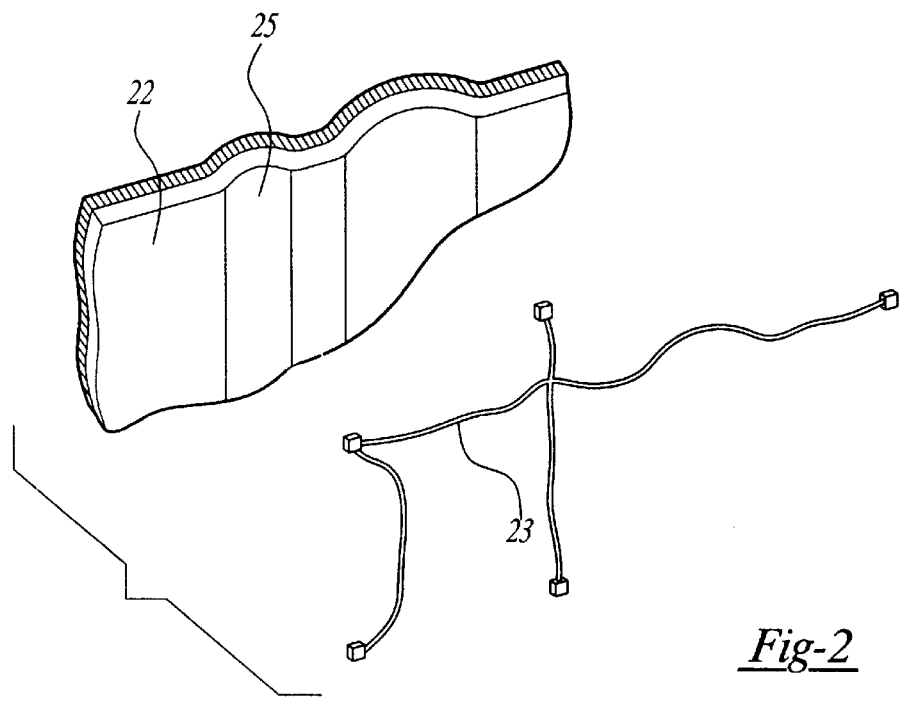
FIG. 2 is an exploded view of the FIG. 1 assembly.

As shown in FIG. 2, preferably the wire harness 23 is assembled in one step and then is attached to the carpet 22 in a second step. As will be explained below, in an alternative embodiment the wire harness could be assembled directly onto the carpet.

Figure 3:
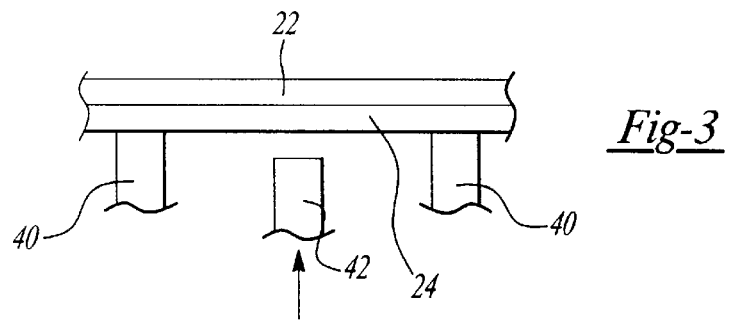
FIG. 3 schematically shows the attachment of the present invention.

FIG. 3 schematically shows the attachment of the wire harness 23 to the carpet 22. As shown, holding jigs 40 hold the wire harness at a desired location while an attachment member 42 is brought to secure the wire harness 23 to the carpet 22. The attachment member 42 can utilize any attachment means to attach the wire harness to the carpet.

Figure 4A:
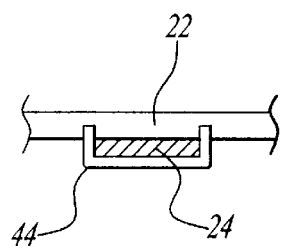
FIG. 4a shows a first attachment method.
Figure 4B:
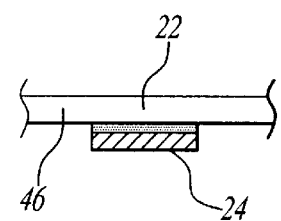
FIG. 4b shows a second attachment method.

As shown in FIG. 4A, the wire harness 23 could be stapled 42 to the carpet 22. As shown in FIG. 4B, an adhesive layer 46 may attach the wire harness 24 to the carpet 22. As shown in FIGS. 4A and 4B, the wire harness may preferably be a flat ribbon cable or Flat Flexible Cable (FFC) or Flexible Printed Circuit (FPC), as is known. As known, flat cable wire harnesses typically include a plurality of wires.

Figure 4C:
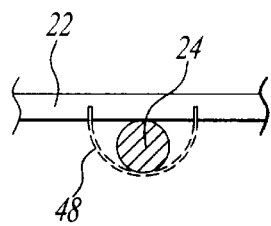
FIG. 4c shows a third attachment method.

As shown in FIG. 4c, the wire harness 24 could be sewn 48 to the carpet 22.

Figure 5:
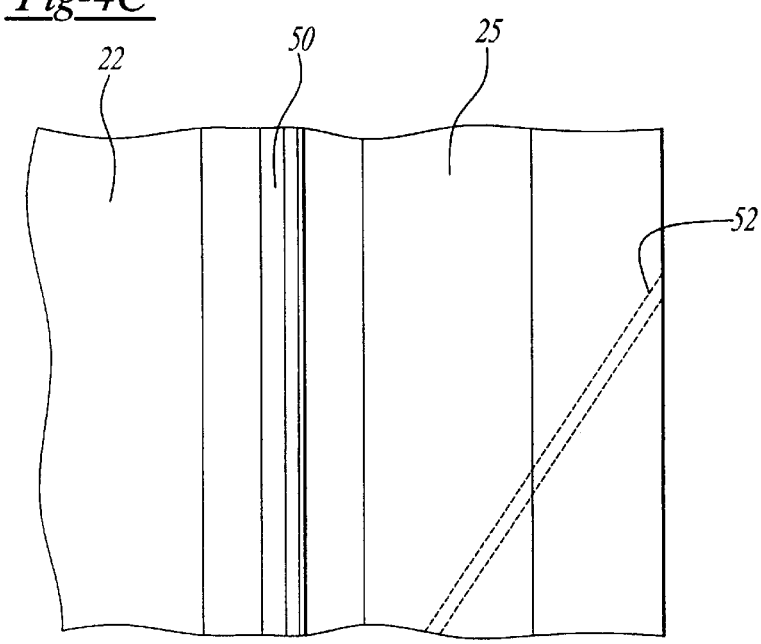
FIG. 5 shows an alternative way of assembling the wire harness onto the carpeting.

FIG. 5 shows another method of assembling the carpet and wire harness as a modular unit. As shown, the carpet 22 could have the wires such as wire 50 routed into the location on the carpet 22, while additional wires 52 are being routed along the desired paths. That is, the wire harness could be assembled directly on the carpet. Once the wires are fully assembled on the carpet, they may be secured by methods such as shown in FIGS. 4A–4C, or any other means.

The present invention utilizes a unique way of providing a modular wire harness and carpet combination. The invention reduces the steps required in the prior art to mount both the wire harness and carpet into the vehicle, and thus reduces the cost associated with such assemblies. Also, the wire harness is better protected throughout assembly when compared to prior methods.

Although a preferred embodiment of this invention has been disclosed, a worker of ordinary skill in the art would recognize that certain modifications come within the scope of this invention. Thus, the following claims should be studied to determine the true scope and content of this invention.

We claim:

1. A method of assembling a carpet and wire harness into a vehicle comprising the steps of:

(1) providing a wire harness having a plurality of wires and a plurality of connectors, and providing a carpet having an outer surface having a decorative appearance, and an under side facing in an opposed direction from said outer surface;

(2) attaching said wire harness to said underside of said carpet to form a modular combination; and (3) then assembling said modular combination of a wire harness and a carpet into a vehicle.

2. A method as set forth in claim 1, wherein said carpet is formed with a ridge extending upwardly from a nominal plane of the carpet when assembled in a vehicle, and at least a portion of the wire harness routed through said ridge.

3. A method as recited in claim 1, wherein said wire harness is stapled to said carpet.

4. A method as recited in claim 1, wherein said wire harness is sewn to said carpet.

5. A method as recited in claim 1, wherein said wire harness is attached to said carpet by adhesive.

6. A method as recited in claim 1, wherein said wire harness utilizes flat ribbon cable.

7. A modular wire harness and carpet combination comprising a wire harness having at least a plurality of wires extending between a plurality of connectors;

a carpet having a outer side for use as a carpeting in a vehicle, and an underside which is to be covered when said carpet is placed in a vehicle; and said wire harness being attached to said underside of said carpet.

8. A modular unit as set forth in claim 7, wherein said wire harness is attached to said carpet by staples.

9. A modular unit as set forth in claim 7, wherein said wire harness is attached to said carpet by an adhesive.

10. A modular unit as set forth in claim 7, wherein said wire harness is sewn to said carpet.

\* \* \* \* \*